UNITED STATES PATENT OFFICE.

JOSEPH R. GROWS, OF BRUNSWICK, MAINE.

IMPROVED LINIMENT.

Specification forming part of Letters Patent No. 43,403, dated July 5, 1864.

*To all whom it may concern:*

Be it known that I, JOSEPH R. GROWS, of the town of Brunswick, in the county of Cumberland and State of Maine, have invented a new and origninal Composition of Matter for Medicinal Purposes; and I do hereby declare that the following is a full and exact description for compounding the same, together with the names of all the ingredients of which the same is composed and the quantity of each ingredient used in making my composition.

The composition itself comprises the following ingredients, mixed in the proportions specified, as follows, viz: To make two gallons of the liniment, take two quarts spirits turpentine, one gallon vinegar, two dozen eggs, (shells and all,) half-pint alcohol, one ounce gum-camphor, half-pint skunk-grease. The foregoing ingredients, mixed in the proportions as above specified, form my composition or liniment.

What I claim as my invention, and desire to secure by Letters Patent, is—

Compounding the ingredients named in the proportions and manner herein described, using for that purpose the aforesaid compounds, which will produce the liniment or composition aforesaid.

JOSEPH R. GROWS.

Witnesses:
    HENRY ORR,
    ORR BROOKS, Jr.